US008280342B1

(12) United States Patent
Manning et al.

(10) Patent No.: US 8,280,342 B1
(45) Date of Patent: Oct. 2, 2012

(54) EMERGENCY SERVICES USING PATH OPTIMIZATION

(75) Inventors: Serge M. Manning, Overland Park, KS (US); Charles Brent Hirschman, Overland Park, KS (US); Frederick C. Rogers, Olathe, KS (US); Jeremy R. Breau, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 1268 days.

(21) Appl. No.: 12/028,879

(22) Filed: Feb. 11, 2008

(51) Int. Cl.
*H04M 11/04* (2006.01)
*H04W 4/00* (2009.01)
*H04W 40/00* (2009.01)
*H04L 12/28* (2006.01)

(52) U.S. Cl. ............ 455/404.1; 455/404.2; 455/432.1; 455/435.1; 455/445; 370/351; 379/45

(58) Field of Classification Search ............ 455/404.1, 455/404.2, 414.1, 422.1, 432.1, 435.1, 440, 455/445, 456.1, 521; 370/328, 352, 351; 379/45, 49
See application file for complete search history.

(56) References Cited

U.S. PATENT DOCUMENTS

| | | | | |
|---|---|---|---|---|
| 7,633,898 | B2 * | 12/2009 | Jain et al. | 370/328 |
| 2002/0085518 | A1 * | 7/2002 | Lim | 370/331 |
| 2004/0190497 | A1 * | 9/2004 | Knox | 370/352 |
| 2005/0135569 | A1 | 6/2005 | Dickinson et al. | |
| 2005/0213716 | A1 | 9/2005 | Zhu et al. | |
| 2006/0280164 | A1 | 12/2006 | Dickinson et al. | |
| 2007/0092070 | A1 * | 4/2007 | Croy et al. | 379/45 |
| 2008/0153453 | A1 * | 6/2008 | Bachmutsky | 455/404.1 |
| 2008/0311881 | A1 * | 12/2008 | Taaghol et al. | 455/404.2 |
| 2010/0135205 | A1 * | 6/2010 | Li et al. | 370/328 |

OTHER PUBLICATIONS

Wikipedia; "IP Multimedia Subsystem;" Oct. 9, 2007; 14 pages; http://en.wikipedia.org/wiki/IP_Multimedia_Subsystem.
Kuntal Chowdhury; "WiMAX Call Localization (aka Local Breakout);" Jan. 29, 2007; pp. 1-15; WiMAX Forum; Starent Networks.
Douglas C. Sicker, et al.; "NET Institute;" Oct. 2004; pp. 1-28; Working Paper #04-19; University of Colorado at Boulder.
Federal Communications Commission; "VoIP and 911 Service;" Dec. 22, 2006; 4 pages; http://www.fcc.gov/cgb/consumerfacts/voip911.html.
Matthew Mintz-Habib, et al.; "A VoIP Emergency Services Architecture and Prototype;" 6 pages; Department of Computer Science, Columbia University.
Jong Yul Kim, et al.; "An Enhanced VoIP Emergency Services Prototype;" May 2006; pp. 1-8; Department of Computer Science, Columbia University.
Intrado Inc.; "VoIP Emergency Calling Services;" 2003; 2 pages; Intrado Inc.; Longmont, Colorado.

* cited by examiner

*Primary Examiner* — Wesley Kim

(57) ABSTRACT

A visited access gateway provides an emergency communication service to a visiting mobile unit. The visiting mobile unit transfers a user registration to a home communication network, and the home communication network transfers a home internet protocol address to the visiting mobile unit. Upon receiving an emergency call request having the home internet protocol address from the visiting mobile unit, the access gateway transfers the emergency call request having the home internet protocol address over a signaling tunnel from the visiting mobile unit to a visited call processing system, receives routing instructions from the visited call processing system, and exchanges emergency communications having the home internet protocol address over a bearer tunnel between the visiting mobile unit and a visited emergency service node.

24 Claims, 4 Drawing Sheets

EMERGENCY SERVICES USING PATH OPTIMIZATION

OVERVIEW

Mobile communication devices, such as wireless phones, enable users to conduct phone calls, transmit and receive text and video data, and access the internet, all while moving from location to location. These devices also allow a user to continue all normal operations while traveling far from home. These travels may take the user out of their home network and into a visited network. While additional charges may apply, the user is still able to make calls and transfer data as they would normally in their home network. When the user is within their home network, calls to emergency service providers, such as the police, fire department or ambulance service, are automatically routed to a local emergency service provider. However, when the user is roaming in a visited network, it is not always clear how such emergency calls should be routed. For example, when a roaming device calls for emergency services, the roaming network will automatically route the call to the device's home network for processing even though the device is not within the range of the home network.

TECHNICAL SUMMARY

In various embodiments methods, systems, and software for operating a visited access gateway to provide an emergency communication service to a visiting mobile unit are provided. In an embodiment, the method comprises transferring a user registration from the visiting mobile unit to a home communication network, and transferring a home internet protocol address from the home communication network to the visiting mobile unit. Upon receiving an emergency call request having the home internet protocol address from the visiting mobile unit, the method continues by transferring the emergency call request having the home internet protocol address over a signaling tunnel from the visiting mobile unit to a visited call processing system, receiving routing instructions from the visited call processing system, and exchanging emergency communications having the home internet protocol address over a bearer tunnel between the visiting mobile unit and a visited emergency service node.

In another embodiment, a communication system for operating a visited access gateway to provide an emergency communication service to a visiting mobile unit, comprises a home communication network, a visited access gateway, a visited call processing system, a visited emergency service node, and a signaling tunnel between a visiting mobile unit and the visited call processing system. The home communication network is configured to receive a user registration from a visiting mobile unit, and transfer a home internet protocol address to the visiting mobile unit. The visited access gateway is configured to receive an emergency call request having the home internet protocol address from the visiting mobile unit, transfer the emergency call request having the home internet protocol address over the signaling tunnel, receive routing instructions from the visited call processing system, and exchange emergency communications having the home internet protocol address over a bearer tunnel between the visiting mobile unit and a visited emergency service node.

In a further embodiment, a computer-readable medium containing software for operating a communication system, including a visited access gateway, to provide an emergency communication service to a visiting mobile unit is provided. When the software is executed by the communication system, the communication system is directed to transfer a user registration from the visiting mobile unit to a home communication network, and transfer a home internet protocol address from the home communication network to the visiting mobile unit. Upon receiving an emergency call request having the home internet protocol address from the visiting mobile unit, the communication system is further directed to transfer the emergency call request having the home internet protocol address over a signaling tunnel from the visiting mobile unit to a visited call processing system, receive routing instructions from the visited call processing system, and exchange emergency communications having the home internet protocol address over a bearer tunnel between the visiting mobile unit and a visited emergency service node.

DETAILED DESCRIPTION

Figure 1:
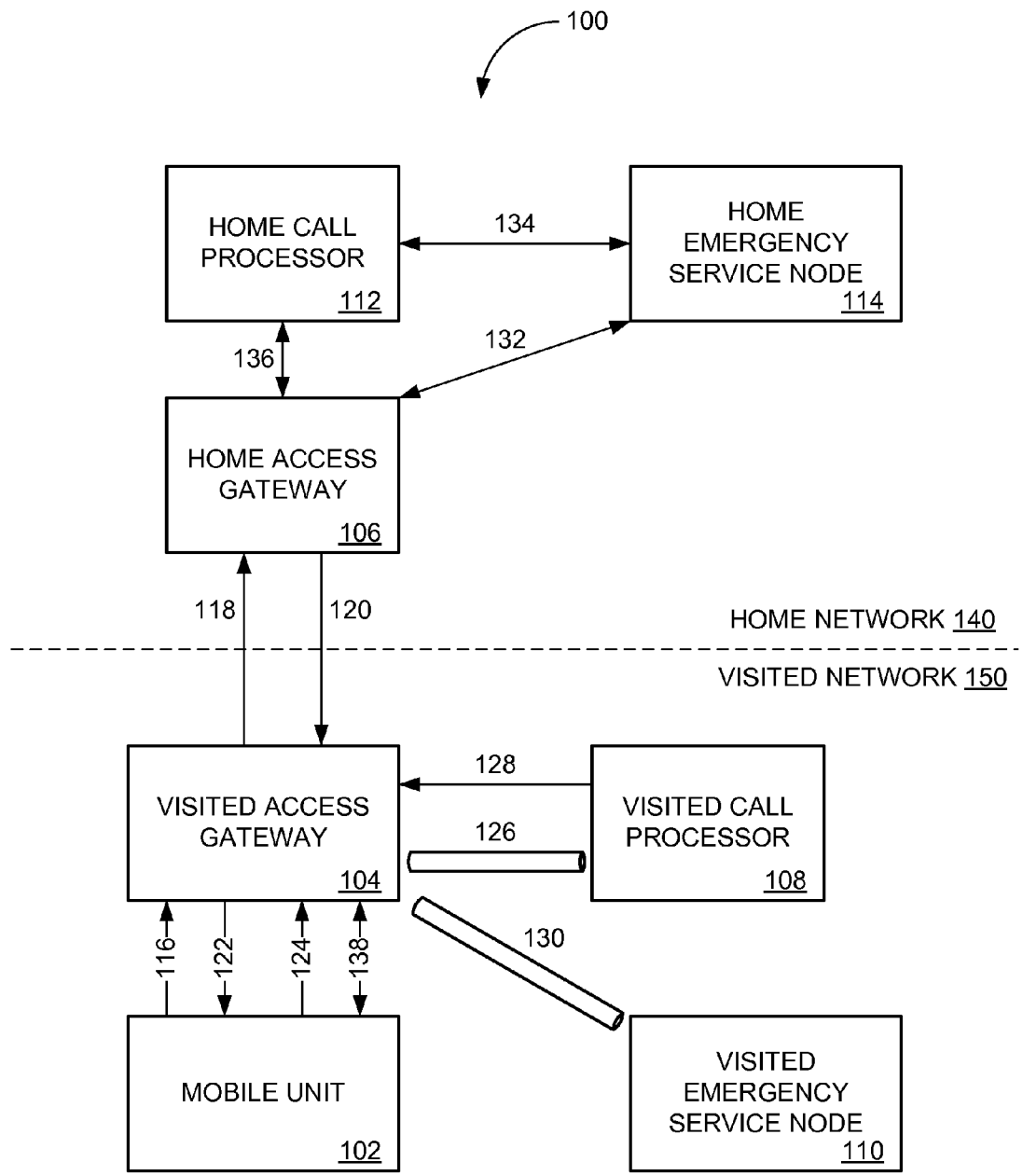
FIG. 1 is a block diagram illustrating a communication system.

FIG. 1 is a block diagram illustrating a communication system 100. Communication system 100 includes home network 140 coupled with visited network 150. Home network 140 includes home access gateway 106, coupled 136 with home call processor 112, and is also coupled 132 with home emergency service node 114. Home call processor 112 is coupled 134 with home emergency service node 114. Visited network 150 includes visited access gateway 104, visited call processor 108, and visited emergency service node 110. Mobile unit 102 from home network 140 is also present in visited network 150. Normally, when mobile unit 102 is not roaming and is located within home network 104, an emergency call, such as a 911 call, (not shown in this illustration) from mobile unit 102 will be setup by home call processor 112 connecting mobile unit 102 to home emergency service node 114. However, when mobile unit 102 is roaming, home emergency service node 114 may be of little use if mobile unit 102 is not located within the service area of home emergency service node 114. This problem may have fatal consequences if the emergency call from mobile unit 102 is unable to reach an appropriate emergency service node.

When mobile unit 102 is located within visited network 150, it is serviced by visited access gateway 104. Typically the service provided by visited access gateway 104 entails providing transport back to home network 140. However, visited access gateway 104 has been enhanced to provide emergency services. Visited access gateway 104 is configured to receive user registration 116 from mobile unit 102 and transfer the user registration 118 to home call processor 112 through home access gateway 106. In response, home call processor 112 sends a home internet protocol (IP) address 120 through home access gateway 106 to visited access gateway 104 which forwards the home IP address 122 to mobile unit 102.

When visited access gateway 104 receives an emergency call request 124 having the home IP address from mobile unit 102, it transfers the emergency call request having the home IP address over signaling tunnel 126 to visited call processor 108. Advantageously, visited access gateway 104 transfers the emergency services request over the tunnel 126 to visited call processor 108 even if the emergency services request is addressed to home network 140. Thus, the emergency services call is processed locally by visited call processor 108. Optionally, visited call processor 108 may perform an expedited registration procedure for the emergency services request. Visited call processor 108 then sends routing instructions 128, including an IP address for visited emergency service node 110 and the identity of a bearer tunnel 130, to visited access gateway 104. Visited call processor 108 also alerts the visited emergency service node 110 that a call will be arriving from visited access gateway 104 through bearer tunnel 130. In response to these routing instructions 128, visited access gateway 104 uses bearer tunnel 130 from mobile unit 102, through visited access gateway 104, to visited emergency service node 110, such as a public safety answering point (PSAP), enabling mobile unit 102 to exchange emergency communications 138 having the home IP address with visited emergency service node 110 over bearer tunnel 130. Advantageously, by using tunnel 130, emergency voice communications from emergency service node 110 to mobile unit 102, are kept within visited network 150 and not re-routed through home network 140.

An IP tunnel, such as bearer tunnel 130, refers to the process of embedding one IP packet inside of another IP packet to simulate a physical connection between the two devices at the ends of the IP tunnel. For example, when a packet enters a tunnel, the sending device adds an additional header to the IP packet containing the address of the receiving device at the exit of the tunnel and sends this encapsulated packet to the receiving device. When the receiving device receives the encapsulated packet it strips off the additional header containing its address and utilizes the IP packet as if it had been sent normally.

In the example illustrated in FIG. 1, visited access gateway 104 receives an IP packet from mobile unit 102 directed to visited emergency service node 110. The header of the IP packet contains the correct destination address for visited emergency service node 110, and the source address is the home IP address for mobile unit 102. If visited access gateway 104 sends this IP packet to visited emergency service node 110 without modification, when visited emergency service node 110 replies with an IP packet, the header for this reply IP packet will contain the home IP address for mobile unit 102 in the destination address field. This reply packet would then be automatically routed to home network 140 based on the home IP address for mobile unit 102. Thus, visited access gateway 104 must modify the IP packet received from mobile unit 102 before sending the packet to visited emergency service node 110. This modification may comprise encapsulating the IP packet from mobile unit 102 with a new header. This new header would contain the IP address for visited access gateway 104 as the source address so the IP packets can be properly routed from the visited access gateway 104 to the visited emergency service node 110. Similarly, reply packets from the visited emergency service node 110 back to the mobile unit 102 will also be encapsulated in IP packets to be properly routed from visited emergency service node 110 to the visited access gateway 104.

Alternatively, visited access gateway 104 may modify the header of the IP packet received from mobile unit 102 instead of adding a new header to the IP packet. In this example, visited access gateway 104 would replace the source address within the header with its own IP address, such that when visited emergency service node 110 sends a reply packet it will automatically use the source address from the modified header as the destination address for its reply packet. This causes the reply packet to go to visited access gateway 104 where it is forwarded to mobile unit 102 instead of being routed to mobile unit 102 through home network 140.

Figure 2:
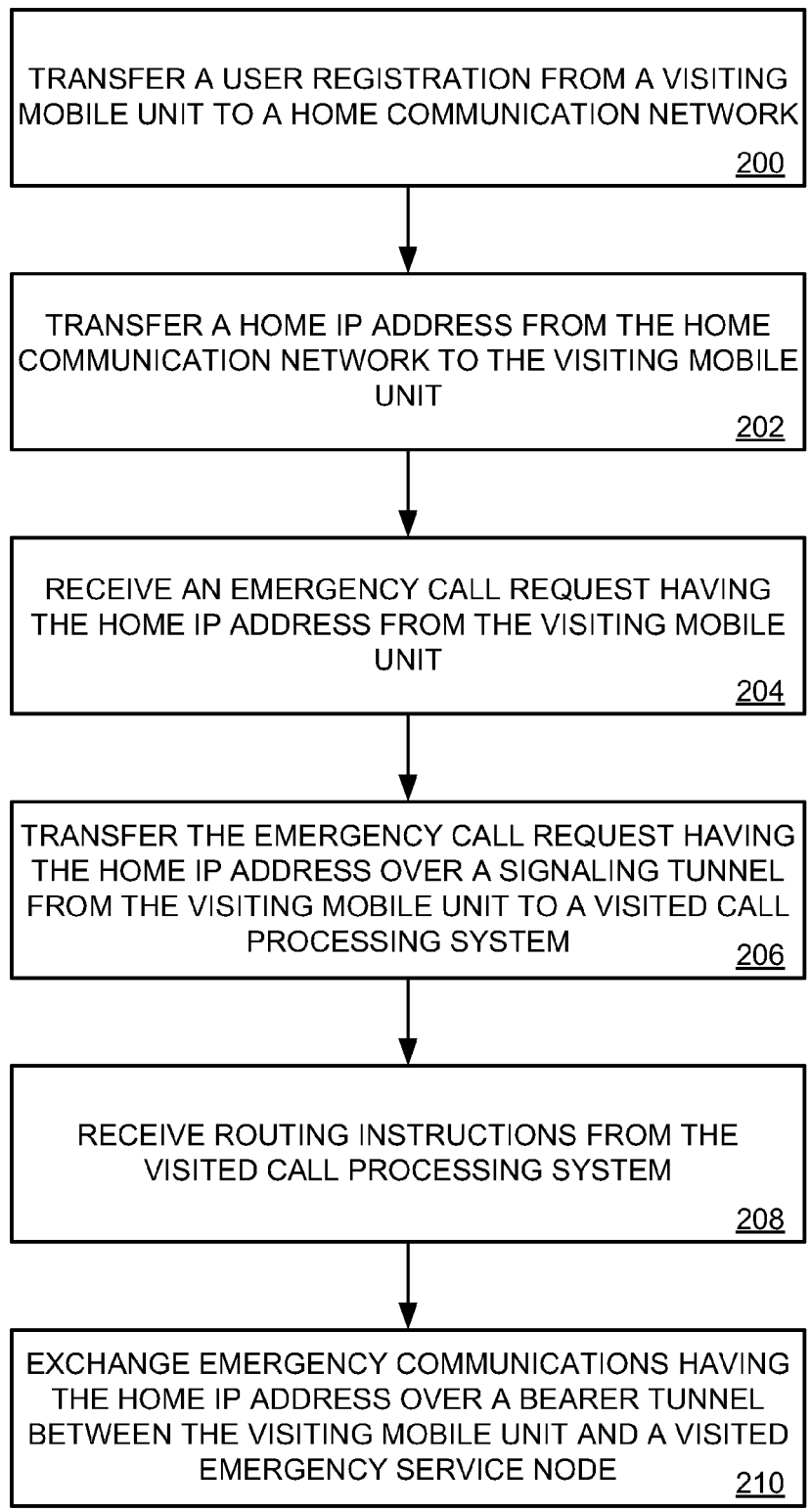
FIG. 2 is a flow diagram illustrating a method of operating a visited access gateway to provide an emergency communication service to a visiting mobile unit.

FIG. 2 is a flow diagram illustrating a method of operating a visited access gateway 104 to provide an emergency communication service to a visiting mobile unit 102. Reference numbers from FIG. 2 are indicated parenthetically below. Visited access gateway 104 transfers a user registration 116 from visiting mobile unit 102 to home communication network 140, (operation 200). Home access gateway 106 receives the user registration 118 from visited access gateway 104 and transfers a home IP address 120 to visited access gateway 104. Visited access gateway 104 then transfers the home IP address 122 from home communication network 140 to visiting mobile unit 102, (operation 202). Visited access gateway 104 receives an emergency call request having the home IP address 124 from visiting mobile unit 102, (operation 204). Visited access gateway 104 then transfers the emergency call request having the home IP address 124 over signaling tunnel 126 from visiting mobile unit 102 to visited call processing system 108, (operation 206). Visited access gateway 104 then receives routing instructions 128 from visited call processing system 108, (operation 208). Finally, visited access gateway 104 uses bearer tunnel 130 between visiting mobile unit 102 and visited emergency service node 110, configured for the exchange of emergency communications having the home IP address between visiting mobile unit 102 and visited emergency service node 110, (operation 210).

Figure 3:
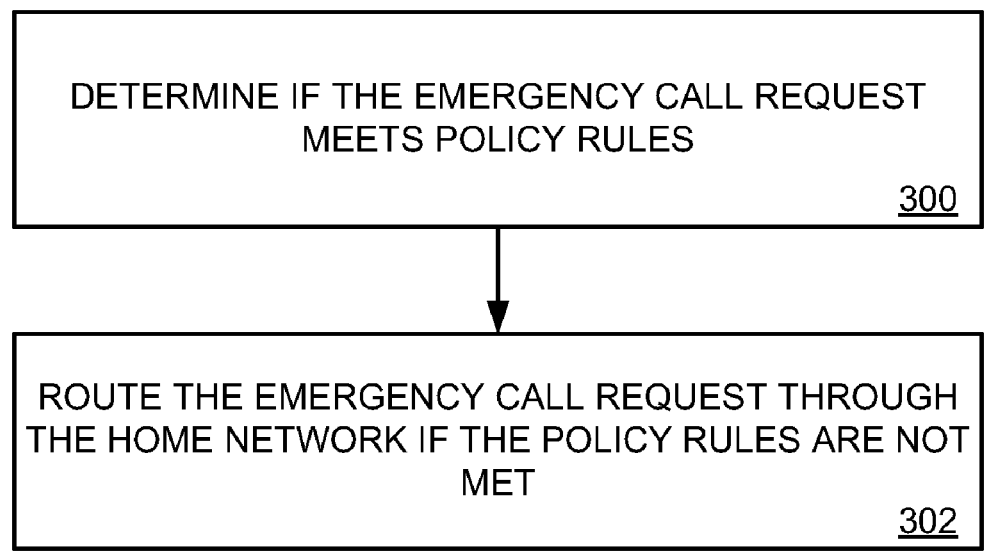
FIG. 3 is a flow diagram illustrating a method of operating a visited access gateway to provide an emergency communication service to a visiting mobile unit.

FIG. 3 is a flow diagram illustrating a method of operating a visited access gateway 104 to provide an emergency communication service to a visiting mobile unit 102. In some embodiments visited access gateway 104 may include a set of emergency policy rules describing which types of emergency call requests from visiting mobile units may be processed by visited access gateway 104. The set of emergency policy rules may be provided by home network 140. In these embodiments, when visited access gateway 104 receives an emergency call request 124 from visiting mobile unit 102, it first determines if the emergency call request 124 meets these policy rules, (operation 300). Then, if the emergency call request 124 does not meet the policy rules, visited access gateway 104 routes the emergency call request 124 through home network 140 for processing, (operation 302).

Figure 4:
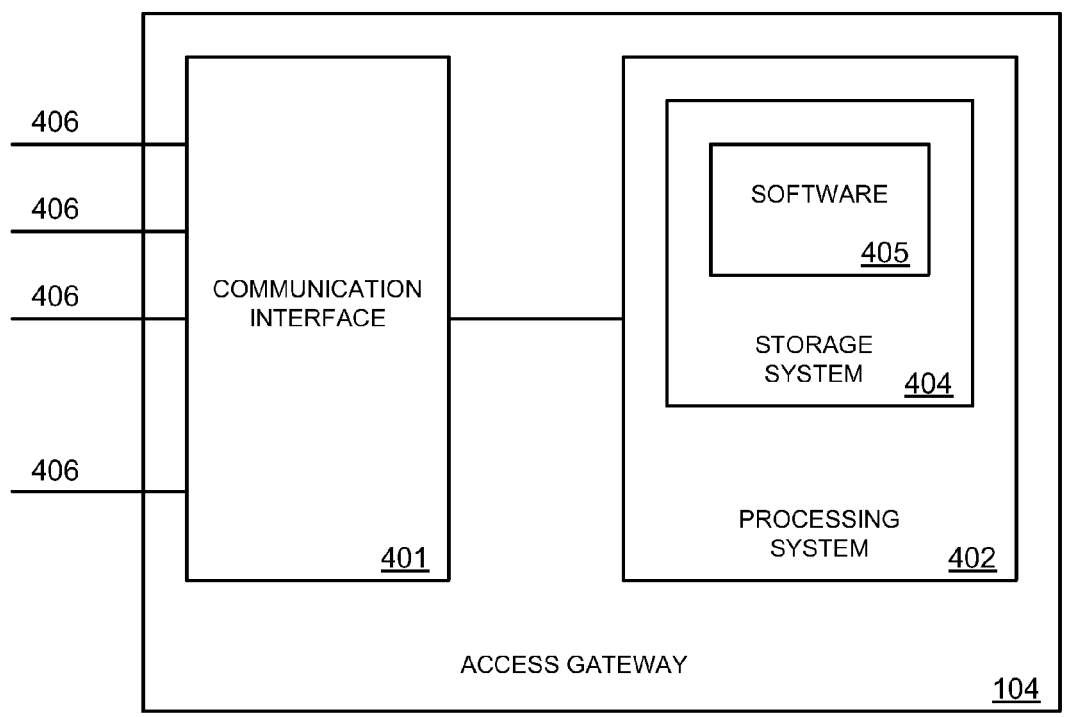
FIG. 4 is a block diagram illustrating a visited access gateway implemented as a computer system.

FIG. 4 is a block diagram illustrating a visited access gateway 104 implemented as a computer system 400. Computer system 400 includes communication interface 401 and processing system 402. Processing system 402 includes storage system 404. Storage system 404 stores software 405. Processing system 402 is linked to communication interface 401. Computer system 400 may be distributed among multiple devices that together comprise elements 401-405.

Communication interface 401 could comprise a network interface, gateway, and may include multiple ports including RF transceivers, routers, and the like. Communication interface 401 may be distributed among multiple communication devices. Processing system 402 could comprise a computer microprocessor, logic circuit, or some other processing device. Processing system 402 may be distributed among multiple processing devices. User interface 403 could comprise a keyboard, mouse, voice recognition interface, microphone and speakers, graphical display, touch screen, or some other type of user device.

Processing system 402 retrieves and executes software 405 from storage system 404. Software 405 may comprise an operating system, utilities, drivers, networking software, and other software typically loaded onto a computer system. Software 405 could comprise an application program, firmware, or some other form of machine-readable processing instructions. When executed by processing system 402, software 405 directs processing system 402 to operate computer system 400 as a visited access gateway 104 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a visited access gateway to provide an emergency communication service to a visiting mobile unit, the method comprising:
    transferring a user registration from the visiting mobile unit to a home communication network;
    receiving the user registration in the home communication network and transferring a home internet protocol address from the home communication network to the visiting mobile unit;
    in the visited access gateway:
        receiving an emergency call request having the home internet protocol address from the visiting mobile unit;
        transferring the emergency call request having the home internet protocol address over a signaling tunnel from the visiting mobile unit to a visited call processing system;
        receiving routing instructions from the visited call processing system, wherein the routing instructions include an internet protocol address for a visited emergency service node and an identity of a bearer tunnel between the visiting mobile unit and the visited emergency service node; and
        in accordance with the routing instructions, exchanging emergency communications having the home internet protocol address over the bearer tunnel between the visiting mobile unit and the visited emergency service node.

2. The method of claim 1, further comprising:
    determining if the emergency call request meets policy rules; and
    routing the emergency communications through the home communication network if the policy rules are not met.

3. The method of claim 2, wherein the policy rules are received from a home call processing system and the visited call processing system.

4. The method of claim 1, wherein the visited call processing system translates a 911 call to a media gateway IP address.

5. The method of claim 1, wherein the emergency communications over the bearer tunnel between the visiting mobile unit and the visited emergency service node is established on a public switched telephone network (PSTN).

6. The method of claim 1, wherein the signaling tunnel is pre-existing.

7. The method of claim 1, wherein the emergency call request has an explicit indication that it is for emergency services.

8. The method of claim 1, wherein the visited emergency service node is a public safety answering point (PSAP).

9. A communication system for operating a visited access gateway to provide an emergency communication service to a visiting mobile unit, comprising:
    the visited access gateway;
    a visited call processing system;
    a visited emergency service node; and
    a signaling tunnel between the visiting mobile unit and the visited call processing system;
    wherein a home communication network is configured to receive a user registration from a visiting mobile unit, and transfer a home internet protocol address to the visiting mobile unit;
    wherein the visited access gateway is configured to receive an emergency call request having the home internet protocol address from the visiting mobile unit;
    wherein the visited access gateway is also configured to transfer the emergency call request having the home internet protocol address over the signaling tunnel;
    wherein the visited access gateway is also configured to receive routing instructions from the visited call processing system, wherein the routing instructions include an internet protocol address for the visited emergency service node and an identity of a bearer tunnel between the visiting mobile unit and the visited emergency service node; and
    wherein the visited access gateway is also configured to, in accordance with the routing instructions, exchange emergency communications having the home internet protocol address over the bearer tunnel between the visiting mobile unit and the visited emergency service node.

10. The communication system of claim 9, wherein the visited access gateway is also configured to determine if the emergency call request meets policy rules, and to route the emergency communications through the home communication network if the policy rules are not met.

11. The communication system of claim 10, wherein the policy rules are received from a home call processing system within the home communication network and the visited call processing system.

12. The communication system of claim 9, wherein the visited call processing system is also configured to translate a 911 call to a media gateway IP address.

13. The communication system of claim 9, wherein the emergency communications over the bearer tunnel between the visiting mobile unit and the visited emergency service node is established on a public switched telephone network (PSTN).

14. The communication system of claim 9 wherein the signaling tunnel is pre-existing.

15. The communication system of claim 9, wherein the emergency call request has an explicit indication that it is for emergency services.

16. The communication system of claim 9, wherein the visited emergency service node is a public safety answering point (PSAP).

17. A non-transitory computer-readable medium having instructions stored thereon for operating a communication system including a visited access gateway to provide an emergency communication service to a visiting mobile unit, wherein the instructions, when executed by the communication system, direct the communication system to:
    transfer a user registration from the visiting mobile unit to a home communication network;

receive the user registration in the home communication network and transfer a home internet protocol address from the home communication network to the visiting mobile unit;

in the visited access gateway:

receive an emergency call request having the home internet protocol address from the visiting mobile unit;

transfer the emergency call request having the home internet protocol address over a signaling tunnel from the visiting mobile unit to a visited call processing system;

receive routing instructions from the visited call processing system, wherein the routing instructions include an internet protocol address for a visited emergency service node and an identity of a bearer tunnel between the visiting mobile unit and the visited emergency service node; and in accordance with the routing instructions, exchange emergency communications having the home internet protocol address over the bearer tunnel between the visiting mobile unit and the visited emergency service node.

18. The non-transitory computer-readable medium of claim 17, further comprising instructions directing the communication system to:

determine if the emergency call request meets policy rules; and route the emergency communications through the home communication network if the policy rules are not met.

19. The non-transitory computer-readable medium of claim 18, wherein the policy rules are received from a home call processing system and the visited call processing system.

20. The non-transitory computer-readable medium of claim 17, wherein the visited call processing system translates a 911 call to a media gateway IP address.

21. The non-transitory computer-readable medium of claim 17, wherein the emergency communications over the bearer tunnel between the visiting mobile unit and the visited emergency service node is established on a public switched telephone network (PSTN).

22. The non-transitory computer-readable medium of claim 17, wherein the signaling tunnel is pre-existing.

23. The non-transitory computer-readable medium of claim 17, wherein the emergency call request has an explicit indication that it is for emergency services.

24. The non-transitory computer-readable medium of claim 17, wherein the visited emergency service node is a public safety answering point (PSAP).

* * * * *